(12) United States Patent
Sooji et al.

(10) Patent No.: US 12,450,150 B2
(45) Date of Patent: Oct. 21, 2025

(54) SYSTEMS AND METHODS FOR IMPACT-CENTRIC SOURCE CODE TESTING BASED ON HISTORICAL EXECUTION ANALYSIS

(71) Applicant: FMR LLC, Boston, MA (US)

(72) Inventors: Krishnaraj Sooji, Bangalore (IN); Aravind Arumugham, Chennai (IN); Ashok Rajashekarappa, Bangalore (IN)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 17/363,854

(22) Filed: Jun. 30, 2021

(65) Prior Publication Data
US 2023/0004484 A1    Jan. 5, 2023

(51) Int. Cl.
*G06F 11/3668*  (2025.01)
*G06F 8/71*  (2018.01)

(52) U.S. Cl.
CPC ............ *G06F 11/3688* (2013.01); *G06F 8/71* (2013.01); *G06F 11/368* (2013.01)

(58) Field of Classification Search
CPC .... G06F 11/36–3696; G06F 8/70; G06F 8/71; G06F 8/75; G06F 8/77; G06F 11/3698
See application file for complete search history.

(56) References Cited

U.S. PATENT DOCUMENTS

| | | | | |
|---|---|---|---|---|
| 8,312,430 B2 * | 11/2012 | Best | ........................ | G06F 8/71 717/122 |
| 8,627,287 B2 * | 1/2014 | Fanning | .................... | G06F 8/75 717/124 |
| 9,489,289 B2 | 11/2016 | Hu et al. | | |
| 10,372,594 B2 * | 8/2019 | Xu | ...................... | G06F 11/3688 |
| 10,380,004 B2 * | 8/2019 | Liemandt | ............ | G06F 11/3672 |

(Continued)

OTHER PUBLICATIONS

Li, B., et al., FCA-CIA: An approach of using FCA to support cross-level change impact analysis for object oriented Java programs, Information & Software Tech., vol. 55 No. 8 [online], 2013 [retrieved Jul. 16, 2022], Rtrv'd from: <URL: https://www.sciencedirect.com/science/article/pii/S0950584>, pp. 1437-1449.*

(Continued)

*Primary Examiner* — Todd Aguilera
(74) *Attorney, Agent, or Firm* — Cesari and McKenna, LLP

(57) ABSTRACT

Systems and methods for implementing impact-centric source code testing based on historical execution analysis. The method includes receiving a source code file including modified classes and unmodified classes. The method also includes storing class names corresponding to the modified classes in a database. The method further includes determining impacted classes in the source code file based on the class names corresponding to the modified classes. The method also includes, for each of the impacted classes in the source code file, identifying at least one test. The method further includes, for each of the impacted classes in the source code file, initiating the at least one test for the impacted class. The method also includes generating a data log including results generated by the at least one test for each of the impacted classes.

10 Claims, 7 Drawing Sheets

(56) References Cited

U.S. PATENT DOCUMENTS

| | | | |
|---|---|---|---|
| 10,430,319 B1 | 10/2019 | Tokappa et al. | |
| 10,733,087 B2* | 8/2020 | Wiener | G06F 11/3466 |
| 10,761,973 B2* | 9/2020 | Zanbar | G06F 11/3628 |
| 10,769,250 B1* | 9/2020 | Tautschnig | G06F 21/577 |
| 10,884,909 B1 | 1/2021 | Chatterjee | |
| 11,550,758 B2* | 1/2023 | Maddila | G06Q 10/101 |
| 11,552,847 B1* | 1/2023 | Lake | H04L 41/0816 |
| 2009/0144698 A1* | 6/2009 | Fanning | G06F 11/3676 717/120 |
| 2010/0058294 A1* | 3/2010 | Best | G06F 11/3688 717/122 |
| 2011/0219359 A1* | 9/2011 | Gupta | G06F 9/44 717/124 |
| 2014/0282411 A1* | 9/2014 | Liemandt | G06F 11/3688 717/124 |
| 2017/0132119 A1* | 5/2017 | Xu | G06F 11/368 |
| 2018/0246803 A1* | 8/2018 | Zhang | G06F 11/3688 |
| 2019/0095315 A1* | 3/2019 | Zanbar | G06F 11/3604 |
| 2019/0294536 A1* | 9/2019 | Avisror | G06F 11/3692 |
| 2019/0377666 A1 | 12/2019 | Klein | |
| 2020/0125485 A1* | 4/2020 | Wiener | G06F 11/3688 |
| 2020/0349055 A1 | 11/2020 | Reddy et al. | |

OTHER PUBLICATIONS

Kpodjedo, S., et al., Not all classes are created equal: Toward a Recommendation System for Focusing Testing, Proceedings of the int'l workshop on Recommendation systems for software engineering [online], 2008 [retrieved Jul. 15, 2022], Rtrv'd from: <URL: https://dl.acm.org/doi/pdf/10.1145/1454247.1454250>, pp. 6-10.*

Hu, Z., et al., "Improving Feedback on Github Pull Requests: A Bots Approach", 2019 IEEE Frontiers in Education Conference [online], 2019 [retrieved May 25, 2023], Retrieved from Internet: <URL: https://ieeexplore.ieee.org/abstract/document/9028685>, pp. 1-9.*

Anonymous, "Inspecting Changes with Diffs", Tower [online], Apr. 13, 2021 [retrieved Mar. 7, 2025], Retrieved from Internet: <https://web.archive.org/web/20210413105100/https://www.git-tower.com/learn/git/ebook/en/command-line/advanced-topics/diffs/>, whole document.*

* cited by examiner

| id integer | testclass character varying | testname character varying | sourcefile character varying | coverage character varying | linenumber integer | updated integer |
|---|---|---|---|---|---|---|
| [null] | com.fmr.app.Calcula... | threeXThreeIsNine | Calculator.java | FC | 3 | 1 |
| [null] | com.fmr.app.Calcula... | threeMinusMinusThr... | Calculator.java | FC | 3 | 1 |
| [null] | com.fmr.app.Calcula... | twoAndMinusTwoIs... | Calculator.java | FC | 3 | 1 |
| [null] | com.fmr.app.Calcula... | threeXThreeIsNine | Calculator.java | FC | 14 | 1 |
| [null] | com.fmr.app.Calcula... | twoAndMinusTwoIs... | Calculator.java | FC | 8 | 1 |
| [null] | com.fmr.app.Calcula... | threeMinusMinusThr... | Calculator.java | FC | 11 | 1 |
| [null] | com.fmr.app.Calcula... | twoAndThreeIsFive | Calculator.java | FC | 3 | 1 |
| [null] | com.fmr.app.Calcula... | threeXZeroIsZero | Calculator.java | FC | 3 | 1 |
| [null] | com.fmr.app.Calcula... | threeMinusTwoIsOne | Calculator.java | FC | 3 | 1 |
| [null] | com.fmr.app.Calcula... | threeXZeroIsZero | Calculator.java | FC | 14 | 1 |
| [null] | com.fmr.app.Calcula... | twoAndThreeIsFive | Calculator.java | FC | 8 | 1 |
| [null] | com.fmr.app.Calcula... | threeMinusTwoIsOne | Calculator.java | FC | 11 | 1 |
| [null] | com.fmr.app.Calcula... | twoAndThreeIsFive | Calculator.java | FC | 3 | 1 |
| [null] | com.fmr.app.Calcula... | threeXZeroIsZero | Calculator.java | FC | 3 | 1 |
| [null] | com.fmr.app.Calcula... | threeMinusTwoIsOne | Calculator.java | FC | 3 | 1 |

FIG. 4

```
INDCMA :ap130365-ic-automation          $ git commit -m "PIDB-1212 This is a demo commit"
ed73cce224bf0c9ea3843fc15bbcde813942bc2b
Commit being analysed – ed73cce224bf0c9ea3843fc15bbcde813942bc2b
Commit Analysis
File is – pdf-report/squad-report/src/components/engineering-maturity.svelte
Added lines
[211, 211, 211, 230, 235]
Removed lines
[205, 206, 207, 229, 234]
Commit Analysis
File is – pdf-report/squad-report/src/scss/engineering-maturity/engineering-maturity.scss
Added lines
[41, 41, 41, 41]
Removed lines
[39, 40]
{'user': 'postgres', 'dbname': 'postgres', 'host': '                                 ', 'port': '      ',
refer', 'sslcompression': '0', 'krbsrvname': 'postgres', 'target_session_attrs': 'any'}
Class Name from DB – com.fmr.app.CalculatorMultiplyTest
Test name – threeXMinusThreeIsMinusNine
Class Name from DB – com.fmr.app.CalculatorMultiplyTest
Test name – threeXZeroIsZero
Class Name from DB – com.fmr.app.CalculatorMultiplyTest
Test name – threeXThreeIsNine
Jira is updated with test details
[master ed73cce] PIDB-1212 This is a demo commit
 1 file changed, 1 insertion(+), 1 deletion(-)
```

FIG. 5

SYSTEMS AND METHODS FOR IMPACT-CENTRIC SOURCE CODE TESTING BASED ON HISTORICAL EXECUTION ANALYSIS

FIELD OF THE INVENTION

The present invention relates generally to systems and methods for testing source code, including systems and methods for testing source code based on historical execution analysis.

BACKGROUND OF THE INVENTION

Software applications experience frequent changes, with capabilities added, enhanced, or sometimes even removed. The source code of these software applications undergoes various tests after every change in order to ensure software validity and continued integration. Often, automated builds run unit tests, component tests, functional tests, regression tests and/or integration tests to quickly find software bugs or integration errors. However, as the software source code size increases or goes through numerous changes, the time required to run these tests increases, slowing down pipeline execution.

SUMMARY OF THE INVENTION

Accordingly, an object of the invention is to provide systems and methods for enabling faster execution of functional and unit tests through a selective set of impact centric test executions. For example, it is an object of the invention to provide systems and methods for faster execution of functional and unit tests through a selective set of impact centric test executions based on code changes and historical source code test execution analysis. It is an object of the invention to provide systems and methods for identifying high risk source code to be tested. It is an object of the invention to provide systems and methods for providing developers with feedback during coding, code commits, and code reviews. It is an object of the invention to provide systems and methods for implementing impact-centric source code testing based on historical execution analysis.

In some aspects, a computerized method for implementing impact-centric source code testing based on historical execution analysis includes receiving a source code file including modified classes and unmodified classes. The method further includes storing class names corresponding to the modified classes in a database. The method also includes determining impacted classes in the source code file based on the class names corresponding to the modified classes. For example, in some embodiments, the method also includes determining impacted functions in the source code file based on the class names corresponding to the modified classes.

The method further includes, for each of the impacted classes in the source code file, identifying at least one test. In some embodiments, the mapping of tests and impacted classes is performed at each modified/unmodified source code line level. Further, the method includes, for each of the impacted classes in the source code file, initiating the at least one test for the impacted class. In some embodiments, the method also includes determining whether the at least one test has been initiated for each of the impacted classes. For example, in some embodiments, the method further includes, in response to determining that the at least one test has not been initiated for each of the impacted classes, preventing a source code commit. The method also includes generating a data log including results generated by the at least one test for each of the impacted classes.

In some embodiments, the method further includes determining frequently changed classes based on the class names stored in the database. For example, in some embodiments, the method also includes determining high-risk classes in the source code file based on the frequently changed classes. In some embodiments, the identification of high-risk source code is based on the frequency of executions of the source code and/or the number of tests running the same code. In some embodiments, the method further includes, for each of the high-risk classes in the source code file, identifying at least one high value test. For example, in some embodiments, the method also includes, for each of the high-risk classes in the source code file, initiating the at least one high value test for the high-risk class. In some embodiments, the method further includes generating a high-risk data log including results generated by the at least one high value test for each of the high-risk classes. For example, in some embodiments, the method also includes generating for display the data log and the high-risk data log on a user device.

In some aspects, a system for implementing impact-centric source code testing based on historical execution analysis includes a server computing device communicatively coupled to a database and a user device over a network. The server computing device is configured to receive a source code file including modified classes and unmodified classes. The server computing device is also configured to store class names corresponding to the modified classes in the database. Further, the server computing device is configured to determine impacted classes in the source code file based on the class names corresponding to the modified classes. For example, in some embodiments, the server computing device is further configured to determine impacted functions in the source code file based on the class names corresponding to the modified classes.

The server computing device is also configured to, for each of the impacted classes in the source code file, identify at least one test. Further, the server computing device is configured to, for each of the impacted classes in the source code file, initiate the at least one test for the impacted class. In some embodiments, the server computing device is further configured to determine whether the at least one test has been initiated for each of the impacted classes. For example, in some embodiments, the server computing device is further configured to, in response to determining that the at least one test has not been initiated for each of the impacted classes, prevent a source code commit. The server computing device is also configured to generate a data log including results generated by the at least one test for each of the impacted classes.

In some embodiments, the server computing device is further configured to determine frequently changed classes based on the class names stored in the database. For example, in some embodiments, the server computing device is further configured to determine high-risk classes in the source code file based on the frequently changed classes. In some embodiments, the server computing device is further configured to, for each of the high-risk classes in the source code file, identify at least one high value test. For example, in some embodiments, the server computing device is further configured to, for each of the high-risk classes in the source code file, initiate the at least one high value test for the high-risk class. In some embodiments, the server computing device is further configured to generate a high-risk data log including results generated by the at least one high value test for each of the high-risk classes. For example, in some embodiments, the server computing device is further configured to generate for display the data log and the high-risk data log on the user device.

Other aspects and advantages of the invention can become apparent from the following drawings and description, all of which illustrate the principles of the invention, by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 4 is a diagram showing an exemplary visualization of database entries with test to source code mapping, according to embodiments of the technology described herein.

FIG. 5 is a diagram showing an exemplary visualization of identified modifications to source code lines, according to embodiments of the technology described herein.

DETAILED DESCRIPTION OF THE INVENTION

The systems and methods described herein can enable faster execution of functional and unit tests through a selective set of impact centric test executions. For example, in some aspects, the systems and methods described herein can include one or more mechanisms or methods for faster execution of functional and unit tests through a selective set of impact centric test executions based on code changes and historical source code test execution analysis. The system and methods can include mechanisms or methods for identifying high risk source code to be tested. The systems and methods described herein can provide mechanisms or methods for providing developers with feedback during coding, code commits, and code reviews.

Figure 1:
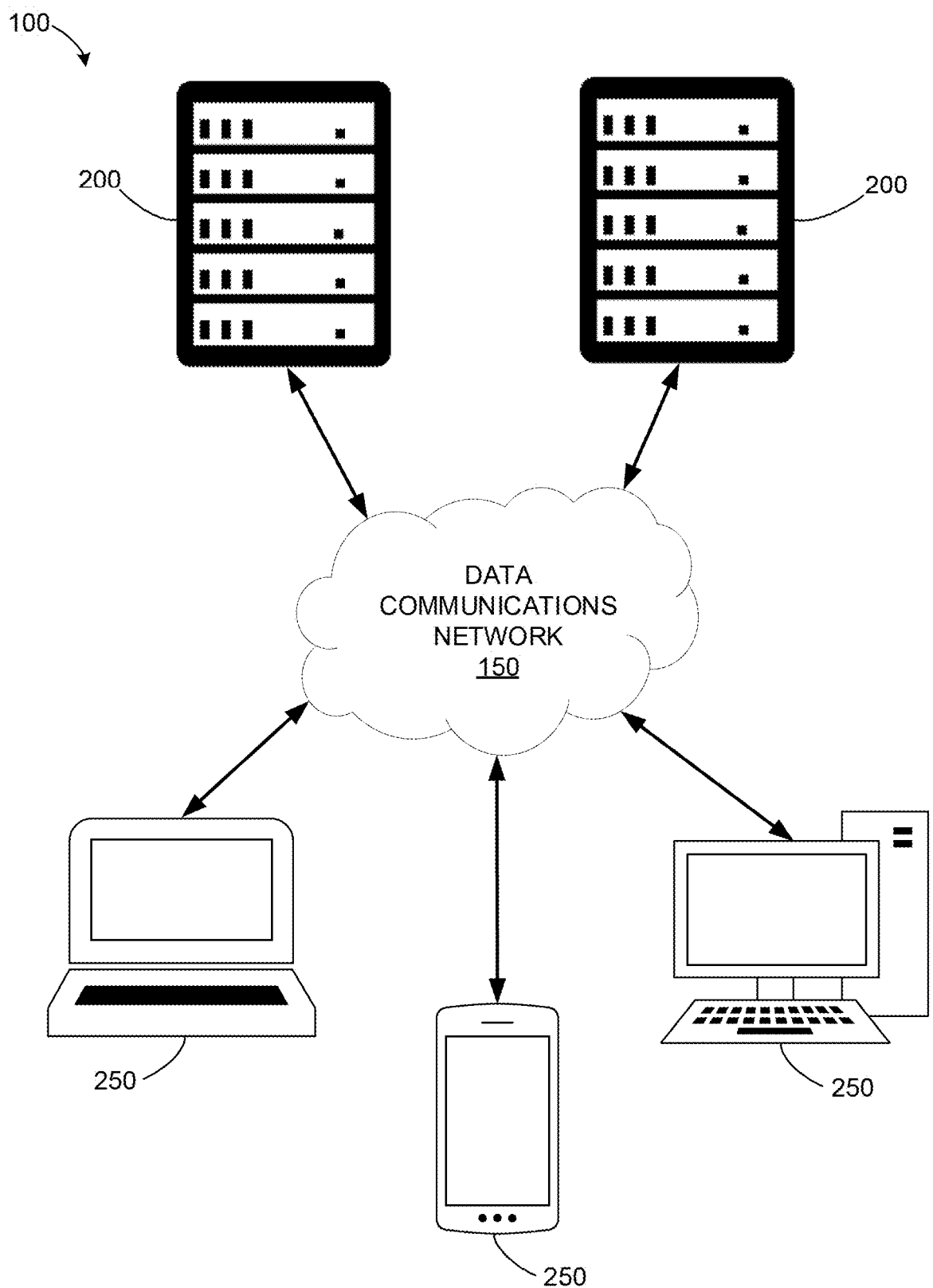
FIG. 1 is a block diagram of an exemplary data communications network, according to embodiments of the technology described herein.
Figure 2:
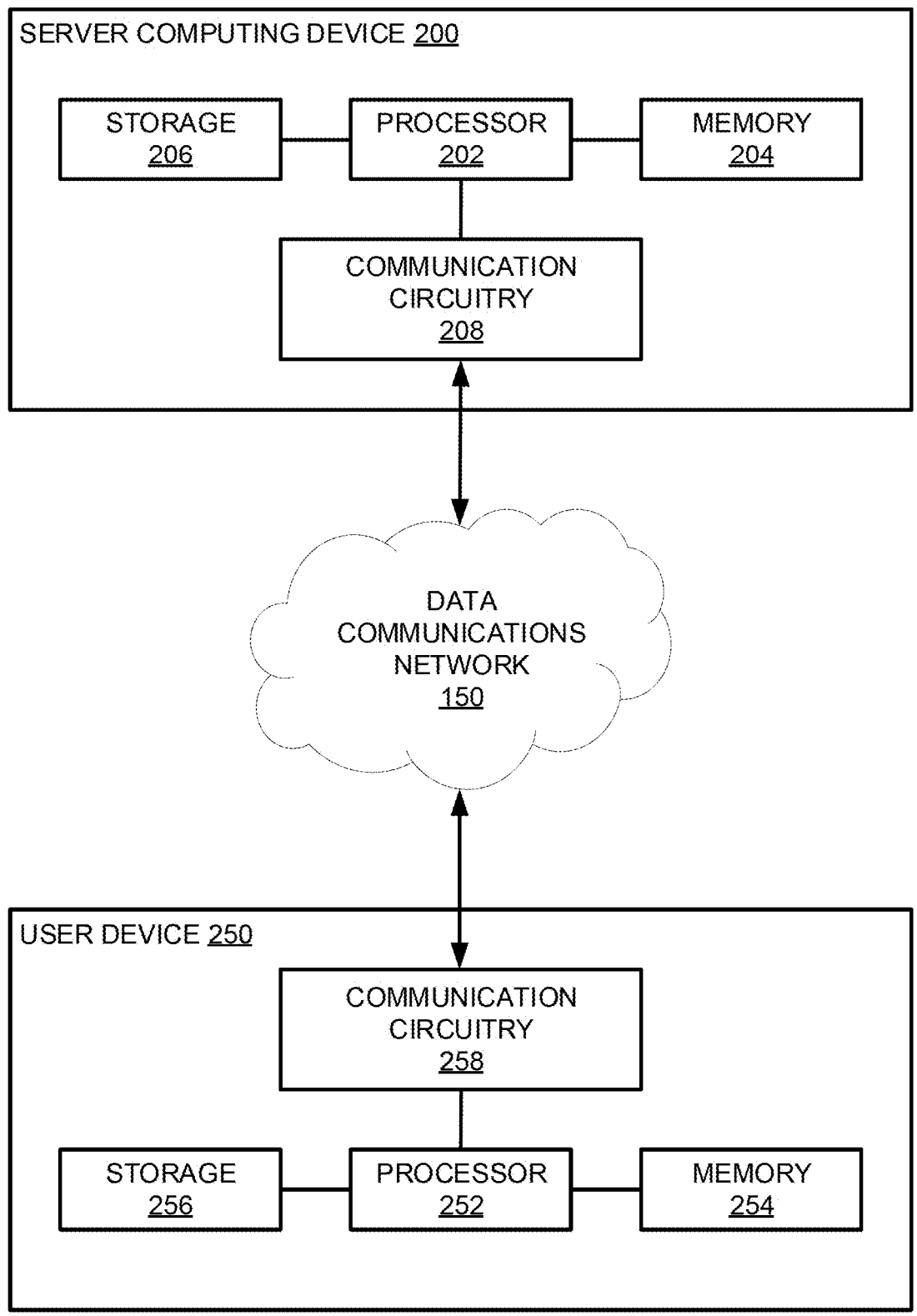
FIG. 2 is a block diagram of an exemplary server computing device and an exemplary user device, according to embodiments of the technology described herein.

The systems and methods described herein can be implemented using a data communications network, server computing devices, and mobile devices. For example, referring to FIGS. 1 and 2, an exemplary communications system 100 includes data communications network 150, exemplary server computing devices 200, and exemplary user devices 250. In some embodiments, the system 100 includes one or more server computing devices 200 and one or more user devices 250. Each server computing device 200 can include a processor 202, memory 204, storage 206, and communication circuitry 208. Each user device 250 can include a processor 252, memory 254, storage 256, and communication circuitry 258. In some embodiments, communication circuitry 208 of the server computing devices 200 is communicatively coupled to the communication circuitry 258 of the user devices 250 via data communications network 150. Communication circuitry 208 and communication circuitry 258 can use Bluetooth, Wi-Fi, or any comparable data transfer connection. The user devices 250 can include personal workstations, laptops, tablets, mobile devices, or any other comparable device.

Figure 3:
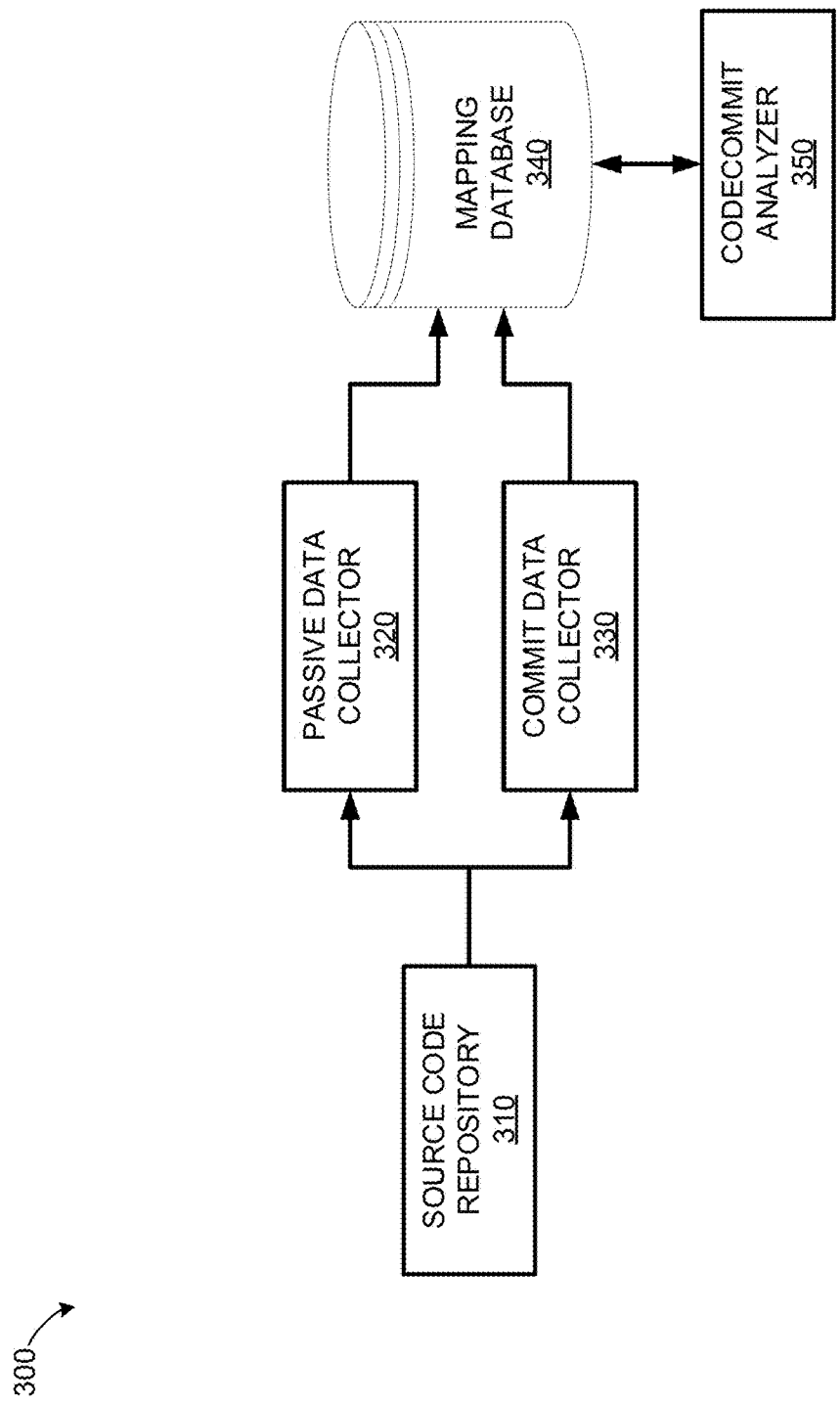
FIG. 3 is a diagram of an exemplary system for implementing impact-centric source code testing based on historical execution analysis, according to embodiments of the technology described herein.

The systems and methods described herein can provide mechanisms or methods for implementing impact-centric source code testing based on historical execution analysis. For example, referring to FIG. 3, a system 300 for implementing impact-centric source code testing based on historical execution analysis is illustrated. System 300 includes source code repository 310, passive data collector 320, commit data collector 330, mapping database 340, and CodeCommit analyzer 350. The elements of system 300 can be implemented using communications system 100.

Source code repository 310 is configured to receive and store source code submitted by developers for code committing. Passive data collector 320 is configured to perform a compiler scan of the source code base and generate a mapping of tests to each line of code based on historical analysis of calls made. Passive data collector 320 is also configured to continuously check for test execution and map the tests to each line based on the coverage during tests. Commit data collector 330 is configured to receive a notification every time a code commit is requested and receive the changes in the source code that the developer wants to commit. Mapping database 340 is configured to store and maintain a mapping of test cases to source code at the line level. Passive data collector 320, commit data collector 330, and CodeCommit analyzer 350 are configured to continuously update mapping database 340. For example, FIG. 4 illustrates an exemplary visualization 400 of database entries with test to source code mapping stored in mapping database 340.

CodeCommit analyzer 350 is configured to then identify whether the changes to the source code included an addition of a new line of code, a modification to an existing line of code, and/or a deletion of an existing line of code. For new lines of code, CodeCommit analyzer 350 is configured to identify a new test from passive data collector 320. For a modification to an existing line of code, CodeCommit analyzer 350 is configured to receive and/or update tests from/to mapping database 340. For a deletion of an existing line of code, CodeCommit analyzer 350 is configured to remove a corresponding test for the deleted line or lines of code. Once all of the changes are analyzed, the tests are logged into a software management tool for execution and traceability. In some embodiments, the software management tool is Jira. For example, FIG. 5 illustrates an exemplary visualization 500 of identified modifications to source code lines and an acknowledgment by the software management tool of updated test details.

During code commit, information on lines impacted with tests to be run is shared with the developer via the software management tool. In some embodiments, if a predefined threshold of source code modified does not have a corresponding test, the code commit is rejected by the software management tool. In some embodiments, system 300 is configured to identify frequently modified source code and flag it as high-risk code to the developer. For example, in some embodiments, system 300 is configured to identify high value test cases for the codebase and provide recommendations to developers to refactor and/or redesign the corresponding change.

Figure 6:
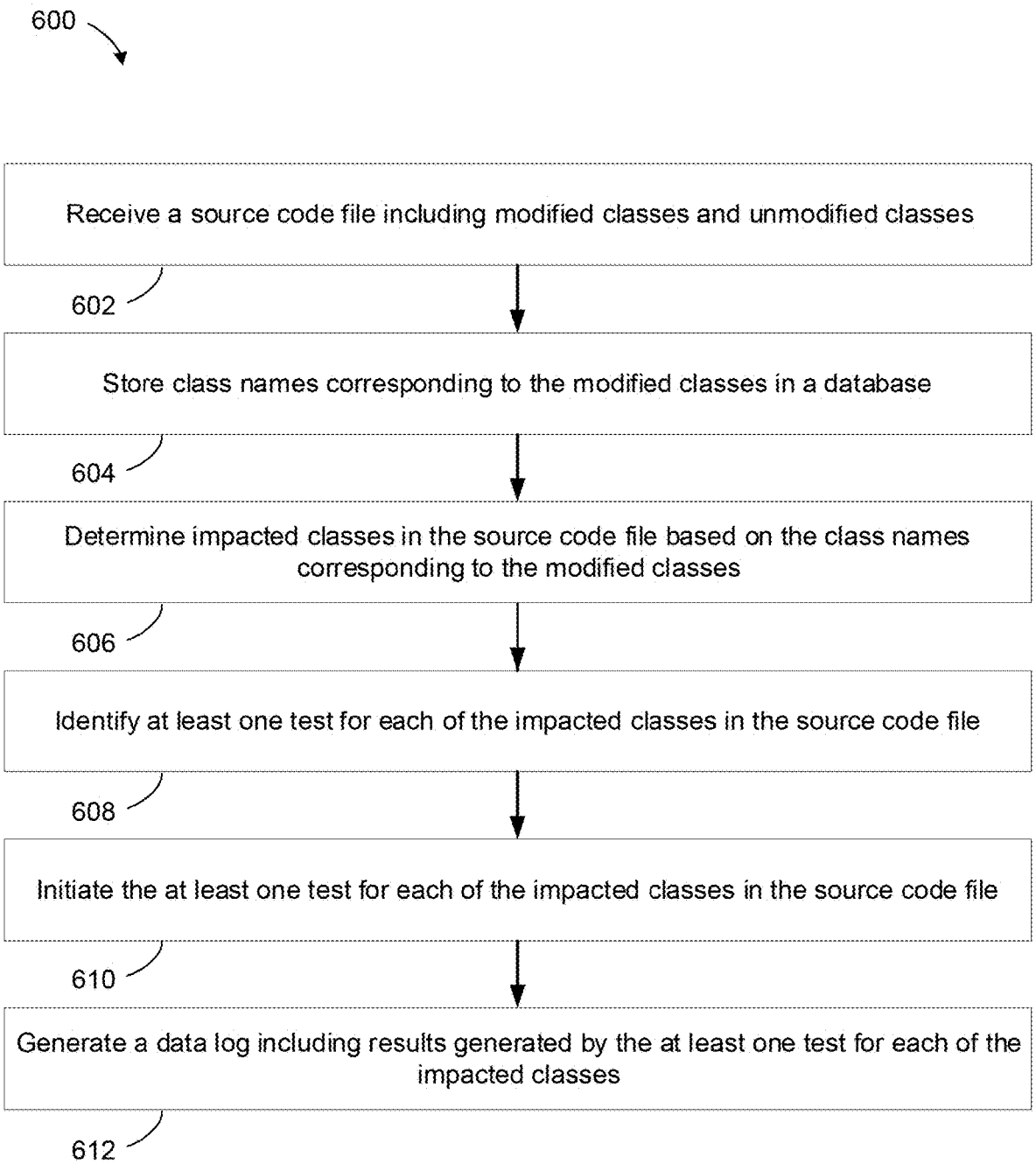
FIG. 6 is a flow diagram of a computer-implemented method for implementing impact-centric source code testing based on historical execution analysis, according to embodiments of the technology described herein.

Referring to FIG. 6, a process 600 for implementing impact-centric source code testing based on historical execution analysis is illustrated. The process 600 begins by receiving, by a server computing device 200, a source code file including modified classes and unmodified classes in step 602. Process 600 continues by storing, by the server computing device 200, class names corresponding to the modified classes in a database 340 in step 604. Process 600 continues by determining, by the server computing device 200, impacted classes in the source code file based on the class names corresponding to the modified classes in step 606. For example, in some embodiments, the server computing device 200 is further configured to determine impacted functions in the source code file based on the class names corresponding to the modified classes.

Process 600 continues by, for each of the impacted classes in the source code file, identifying, by the server computing device 200, at least one test in step 608. In some embodiments, the mapping of tests and impacted classes is performed at each modified/unmodified source code line level. Process 600 continues by, for each of the impacted classes in the source code file, initiating, by the server computing device 200, the at least one test for the impacted class in step 610. In some embodiments, the server computing device 200 is further configured to determine whether the at least one test has been initiated for each of the impacted classes. For example, in some embodiments, the server computing device 200 is further configured to, in response to determining that the at least one test has not been initiated for each of the impacted classes, prevent a source code commit. Process 600 finishes by generating, by the server computing device 200, a data log including results generated by the at least one test for each of the impacted classes in step 612.

In some embodiments, process 600 includes determining, by the server computing device 200, frequently changed classes based on the class names stored in the database 340. For example, in some embodiments, process 600 includes determining, by the server computing device 200, high-risk classes in the source code file based on the frequently changed classes. In some embodiments, the identification of high-risk source code is based on the frequency of executions of the source code and/or the number of tests running the same code. In some embodiments, process 600 includes, for each of the high-risk classes in the source code file, identifying, by the server computing device 200, at least one high value test. For example, in some embodiments, process 600 includes, for each of the high-risk classes in the source code file, initiating, by the server computing device 200, the at least one high value test for the high-risk class. In some embodiments, process 600 includes generating, by the server computing device 200, a high-risk data log including results generated by the at least one high value test for each of the high-risk classes. For example, in some embodiments, process 600 includes generating, by the server computing device 200, for display the data log and the high-risk data log on a user device 250.

In some aspects, process 600 can be implemented on a system 300 for implementing impact-centric source code testing based on historical execution analysis. The system 300 includes a server computing device 200 communicatively coupled to a database 340 and a user device 250 over a network. The server computing device 200 is configured to receive a source code file including modified classes and unmodified classes. The server computing device 200 is also configured to store class names corresponding to the modified classes in the database 340. Further, the server computing device 200 is configured to determine impacted classes in the source code file based on the class names corresponding to the modified classes. For example, in some embodiments, the server computing device 200 is further configured to determine impacted functions in the source code file based on the class names corresponding to the modified classes.

The server computing device 200 is also configured to, for each of the impacted classes in the source code file, identify at least one test. Further, the server computing device 200 is configured to, for each of the impacted classes in the source code file, initiate the at least one test for the impacted class. In some embodiments, the server computing device 200 is further configured to determine whether the at least one test has been initiated for each of the impacted classes. For example, in some embodiments, the server computing device 200 is further configured to, in response to determining that the at least one test has not been initiated for each of the impacted classes, prevent a source code commit. The server computing device 200 is also configured to generate a data log including results generated by the at least one test for each of the impacted classes.

In some embodiments, the server computing device 200 is further configured to determine frequently changed classes based on the class names stored in the database 340. For example, in some embodiments, the server computing device 200 is further configured to determine high-risk classes in the source code file based on the frequently changed classes. In some embodiments, the server computing device 200 is further configured to, for each of the high-risk classes in the source code file, identify at least one high value test. For example, in some embodiments, the server computing device 200 is further configured to, for each of the high-risk classes in the source code file, initiate the at least one high value test for the high-risk class. In some embodiments, the server computing device 200 is further configured to generate a high-risk data log including results generated by the at least one high value test for each of the high-risk classes. For example, in some embodiments, the server computing device 200 is further configured to generate for display the data log and the high-risk data log on the user device 250.

Figure 7:
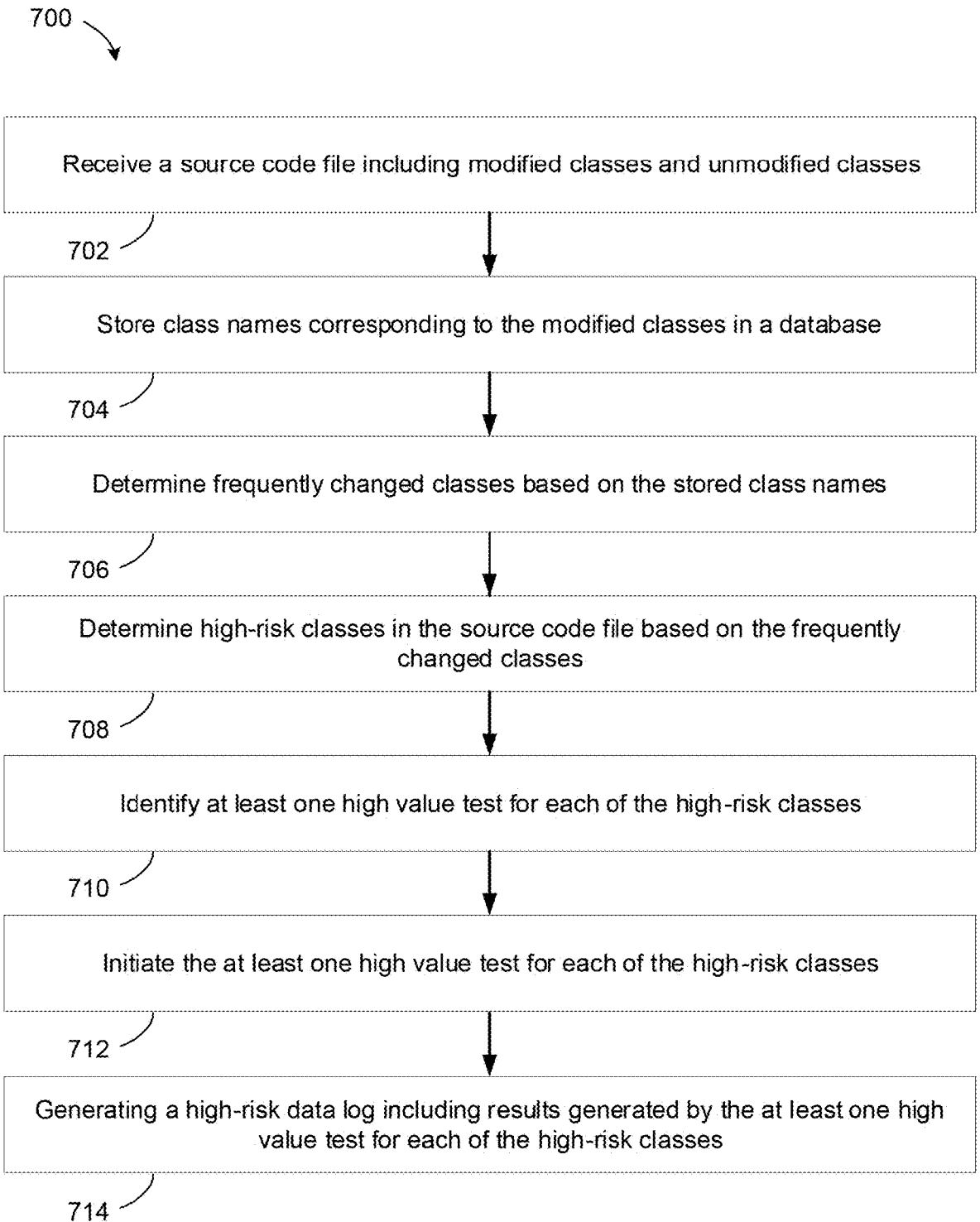
FIG. 7 is a flow diagram of a computer-implemented method for implementing impact-centric source code testing for high-risk source code, according to embodiments of the technology described herein.

Referring to FIG. 7, a process 700 for implementing impact-centric source code testing for high-risk source code is illustrated. Process 700 begins by receiving, by a server computing device 200, a source code file including modified classes and unmodified classes in step 702. Process 700 continues by storing, by the server computing device 200, class names corresponding to the modified classes in a database 340 in step 704. Process 700 continues by determining, by the server computing device 200, frequently changed classes based on the class names stored in the database 340 in step 706.

Process 700 continues by determining, by the server computing device 200, high-risk classes in the source code file based on the determined frequently changed classes in step 708. Process 700 continues by identifying, by the server computing device 200, for each of the high-risk classes in the source code file, at least one high value test in step 710. Process 700 continues by initiating, by the server computing device 200, for each of the high-risk classes in the source code file, the at least one high value test for the high-risk class in step 712. Process 700 finishes by generating, by the server computing device 200, a high-risk data log including results generated by the at least one high value test for each of the high-risk classes in step 714. In some embodiments, process 700 includes generating, by the server computing device 200, for display the high-risk data log on a user device 250.

In some aspects, process 700 can be implemented a system 300 for implementing impact-centric source code testing for high-risk source code. The system 300 includes a server computing device 200 communicatively coupled to a database 340 and a user device 250 over a network. The server computing device 200 is configured to receive a source code file including modified classes and unmodified classes. The server computing device 200 is also configured to store class names corresponding to the modified classes in the database 340. Further, the server computing device 200 is configured to determine frequently changed classes based on the class names stored in the database 340.

The server computing device 200 is also configured to determine high-risk classes in the source code file based on the determined frequently changed classes. Further, the server computing device 200 is configured to identify, for each of the high-risk classes in the source code file, at least one high value test. The server computing device 200 is also configured to initiate, for each of the high-risk classes in the source code file, the at least one high value test for the high-risk class. Further, the server computing device 200 is configured to generate a high-risk data log including results generated by the at least one high value test for each of the high-risk classes. In some embodiments, the server computing device 200 is further configured to generate for display the high-risk data log on the user device 250.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

The above-described techniques can be implemented using supervised learning and/or machine learning algorithms. Supervised learning is the machine learning task of learning a function that maps an input to an output based on example input-output pairs. It infers a function from labeled training data consisting of a set of training examples. Each example is a pair consisting of an input object and a desired output value. A supervised learning algorithm or machine learning algorithm analyzes the training data and produces an inferred function, which can be used for mapping new examples.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed:

1. A computerized method for implementing impact-centric source code testing based on historical execution analysis, the method comprising:

retrieving, by a server computer, historical testing data associated with a source code base, the historical testing data comprising identification of a plurality of tests previously executed against the source code base;

performing, by the server computer, a compiler scan of the source code base to generate a mapping of one or more of the plurality of tests to each line of code in the source code base using the historical testing data;

storing, by the server computer, each of the mappings in a table in a mapping database, each record in the table comprising an id number, a test class identifier, a test name identifier, a source file identifier, a coverage identifier, a line number identifier, and an update flag;

receiving, by the server computer, a source code file comprising a plurality of modified classes and a plurality of unmodified classes, each class associated with a class name;

for each of the plurality of modified classes:
(i) when a new line of code was added to the modified class, the server computer identifies a new test to be mapped to the new line of code using the compiler scan, generates a new mapping of the new test to the new line of code, and adds the new mapping to the mapping database, and
(ii) when an existing line of code was deleted from the modified class, the server computer deletes a mapping for the deleted line of code from the mapping database;

determining, by the server computer, a plurality of impacted classes in the source code file based on the class names corresponding to the plurality of modified classes;

for each of the plurality of impacted classes in the source code file, identifying, by the server computer, at least one test of the plurality of tests historically executed against the plurality of impacted classes using the mapping database;

for each of the plurality of impacted classes in the source code file for which at least one corresponding test is identified, initiating, by the server computer, the at least one identified test for the impacted class;

generating, by the server computer, a data log comprising a plurality of results generated by the at least one test for each of the plurality of impacted classes;

receiving, by the server computer, a notification when a code commit is requested against the source code base, the notification comprising an identification of modified classes in the source code base associated with the code commit;

displaying, by the server computer, a visualization that comprises identification of: the requested code commit, enumeration of each of a plurality of line numbers for added lines to the source code base, and enumeration of each of a plurality of line numbers for removed lines from the source code base;

rejecting, by the server computer, the code commit when a threshold of modified source code in the code commit is not associated with at least one corresponding test; and executing the code commit to integrate the modified source code into the source code base upon determining that a threshold of modified source code in the code commit is associated with at least one corresponding test.

2. The computerized method of claim 1, wherein the server computer further determines a plurality of impacted functions in the source code file based on the class names corresponding to the plurality of modified classes.

3. The computerized method of claim 1, wherein server computer further prevents, in response to identifying that one or more of the plurality of impacted classes does not have a mapping to one or more tests in the mapping database, a source code commit of the source code file.

4. The method of claim 1, further comprising flagging, by the server computer, one or more of the modified classes in the code commit based upon a number of times the modified class has been changed.

5. The method of claim 4, further comprising transmitting, by the server computer, a notification to a client computer that recommends refactoring or redesigning the modified source code.

6. A system for implementing impact-centric source code testing based on historical execution analysis, the system comprising a server computer communicatively coupled to a user computer and a database over a network, the server computer comprising a memory for storing computer-executable instructions and a processor that executes the computer-executable instructions to:

retrieve historical testing data associated with a source code base, the historical testing data comprising identification of a plurality of tests previously executed against the source code base;

perform a compiler scan of the source code base to generate a mapping of one or more of the plurality of tests to each line of code in the source code base using the historical testing data;

storing each of the mappings in a table in a mapping database, each record in the table comprising an id number, a test class identifier, a test name identifier, a source file identifier, a coverage identifier, a line number identifier, and an update flag;

receive a source code file comprising a plurality of modified classes and a plurality of unmodified classes, each class associated with a class name;

for each of the plurality of modified classes:
(i) when a new line of code was added to the modified class, identify a new test to be mapped to the new line of code using the compiler scan, generate a new mapping of the new test to the new line of code, and add the new mapping to the mapping database, and
(ii) when an existing line of code was deleted from the modified class delete a mapping for the deleted line of code from the mapping database;

determine a plurality of impacted classes in the source code file based on the class names corresponding to the plurality of modified classes;

for each of the plurality of impacted classes in the source code file, identify at least one test of the plurality of tests historically executed against the plurality of impacted classes using the mapping database;

for each of the plurality of impacted classes in the source code file for which at least one corresponding test is identified, initiate the at least one identified test for the impacted class;

generate a data log comprising a plurality of results generated by the at least one test for each of the plurality of impacted classes;

receive a notification when a code commit is requested against the source code base, the notification comprising an identification of modified classes in the source code base associated with the code commit;

display a visualization that comprises identification of: the requested code commit, enumeration of each of a plurality of line numbers for added lines to the source code base, and enumeration of each of a plurality of line numbers for removed lines from the source code base;

reject the code commit upon when a threshold of modified source code in the code commit is not associated with at least one corresponding test; and execute the code commit to integrate the modified source code into the source code base upon determining that a threshold of modified source code in the code commit is associated with at least one corresponding test.

7. The system of claim 6, wherein the server computer further determines a plurality of impacted functions in the source code file based on the class names corresponding to the plurality of modified classes.

8. The system of claim 6, wherein the server computer further prevents, in response to identifying that one or more of the plurality of impacted classes does not have a mapping to one or more tests in the mapping database, a source code commit of the source code file.

9. The system of claim 6, wherein the server computer flags one or more of the modified classes in the code commit based upon a number of times the modified class has been changed.

10. The system of claim 9, wherein the server computer transmits a notification to a client computer that recommends refactoring or redesigning the modified source code.

* * * * *